(12) United States Patent
Kim

(10) Patent No.: US 6,665,138 B1
(45) Date of Patent: Dec. 16, 2003

(54) TECHNIQUE FOR DETECTING HEAD POSITION IN HARD DISK DRIVE

(75) Inventor: Gwan-Il Kim, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 493 days.

(21) Appl. No.: 09/709,320

(22) Filed: Nov. 13, 2000

Related U.S. Application Data

(63) Continuation-in-part of application No. 09/018,304, filed on Feb. 3, 1998.

(30) Foreign Application Priority Data

Feb. 11, 1997 (KR) ................................. 97/3945

(51) Int. Cl.[7] ........................... G11B 5/596; G11B 21/02
(52) U.S. Cl. ..................... 360/77.02; 360/75; 360/77.08
(58) Field of Search .............................. 360/75, 77.01, 360/77.02, 77.05, 77.06, 77.08

(56) References Cited

U.S. PATENT DOCUMENTS

| 4,631,606 | A |  | 12/1986 | Sugaya | 360/78 |
|---|---|---|---|---|---|
| 5,105,318 | A |  | 4/1992 | Tsuneta et al. | 360/77.01 |
| 5,146,374 | A |  | 9/1992 | Sakurai | 360/78.14 |
| 5,383,068 | A |  | 1/1995 | Shimizu et al. | 360/78.06 |
| 5,523,900 | A |  | 6/1996 | Kosugi et al. | 360/77.05 |
| 5,576,909 | A | * | 11/1996 | Dierkes et al. | 360/78.09 |
| 5,576,910 | A |  | 11/1996 | Romano et al. | 360/77.08 |
| 5,600,506 | A |  | 2/1997 | Baum et al. | 360/78.14 |
| 5,694,265 | A |  | 12/1997 | Kosugi et al. | 360/77.05 |
| 5,760,990 | A |  | 6/1998 | Ukani et al. | 360/77.08 |
| 5,825,580 | A |  | 10/1998 | Shibata | 360/77.08 |

* cited by examiner

*Primary Examiner*—David Hudspeth
*Assistant Examiner*—Jason Olson
(74) *Attorney, Agent, or Firm*—Robert E. Bushnell, Esq.

(57) ABSTRACT

A technique for detecting a current position of a head of a hard disk drive detects the position of the head by using an analog-to-digital conversion value of a single crossing point of one of first and second servo burst signals written up and down with respect to the center of a selected track and a third burst signal written symmetrically with respect to the center of the selected track.

6 Claims, 4 Drawing Sheets

TECHNIQUE FOR DETECTING HEAD POSITION IN HARD DISK DRIVE

CLAIM OF PRIORITY

This application is a continuation-in-part of Application Ser. No.: 09/018,304 filed Feb. 3, 1998. This application also makes reference to, incorporates the same herein, and claims all benefits accruing under 35 U.S.C. §119 from an application entitled Technique for Detecting Head Position in Hard Disk Drive earlier filed in the Korean Industrial Property Office on Feb. 11, 1997, and there duly assigned Serial No. 97-3945 by that Office.

BACKGROUND OF THE INVENTION

1. Field of the Invention

The present invention relates to a servo control of a hard disk drive, and in particular, to a technique for detecting a current position of a head by detecting an analog-to-digital conversion value detected at a single offset point.

2. Description of the Related Art

A hard disk drive, which is a disk driving recording apparatus, is widely used as an auxiliary memory device of a computer system because it can access a large amount of data at a high speed. A recording form broadly utilized in the hard disk drive has been based on constant-track-capacity. In this recording form, a spindle motor of the hard disk drive rotates at a constant velocity, and information capacity per track in inner and outer tracks of a magnetic disk is identical. However, the information recording density of the outer tracks is lower than that of the inner tracks. Therefore, the storage efficiency of the magnetic disk is degraded.

To overcome such a problem, a constant density recording form or a zone-bit recording form has been proposed. In the constant density recording form, all the tracks including the inner and outer tracks have the same information density in order to improve the information capacity of the magnetic disk, especially in a small-sized disk driving recording apparatus. Moreover, an information recording area on the magnetic disk is split into a plurality of zones so as to have constant recording density in the radial direction from the center of the magnetic disk. The number of data sectors is assigned differently to the tracks of each split zone. That is, the tracks of an outer zone have more data sectors in number than the tracks of an inner zone. The data sector designates a unit area that the hard disk drive accesses data on the magnetic disk and has the same size, 512 bytes for example, irrespective of its position on the magnetic disk. If an embedded sector servo system is used, one data sector may be split into two segments according to each area on the magnetic disk. The embedded sector servo system is one system for providing position information of a head in the disk driving recording apparatus. In the embedded sector servo system, each track is divided into a servo information area and a data information area which are alternatively provided in the direction of the circumference. The servo information area is an area for writing embedded servo information and provides a servo sector. The data information area is an area for writing actual data information is written and provides a data sector.

Since the above-mentioned constant density recording form causes all the tracks to have the substantially identical information density and can record more information per unit track than the conventional constant track capacity recording form, it has widely been used in the hard disk dive.

In a magnetic disk arrangement having the constant density recording form, two data sectors are disposed between servo sectors on a disk. The servo sectors for writing the servo information for the servo controller of the recording head consist of a preamble for adjusting synchronization with a system clock, a servo address mark for writing a reference pattern of servo timing generation, an index bit for providing information with respect to one rotation of the disk, a gray code area for writing track information and a plurality of servo burst areas for the on-track controller of the head.

Normally, burst signals A and B are written with a half value in adjacent tracks and used in detecting a position error signal of the head during track following. Burst signals C and D are written in even and odd tracks and used in discriminating the odd and even tracks respectively.

In the hard disk drive, the servo write pattern of each track is converted into a digital value from an analog value to obtain the position information of the head. To accurately obtain the position information of the head, the A/D conversion value must be processed so as to correspond to the position of the head.

Normally, a servo control means shifts the head to a particular offset point and repeatedly reads the burst signal written in the burst interval while the disk rotates a specified number of times. Thereafter, an average of the A/D conversion values of the detected burst signals is calculated and stored. The head is again shifted to another offset point and the above described steps are then repeated at the second point to obtain the A/D conversion value at that point. The position of the head is calculated utilizing the A/D conversion values at the two points. Since the A/D conversion values must be obtained at two points, the calibration process is delayed.

The following patents each disclose features in common with the present invention but do not teach or suggest the specifically recited technique for detecting the head position in a hard disk drive:

U.S. Pat. No. 5,694,265 to Kosugi et al., entitled a Disk Apparatus for Detecting Position of Head by Reading Phase Servo Pattern, U.S. Pat. No. 5,523,900 to Kosugi et al., entitled a Head Position Detecting Method and Apparatus, U.S. Pat. No. 5,576,910 to Romano et al., entitled a Burst Comparison and Sequential Technique for Determining Servo Control in a Mass Storage Disk Device, U.S. Pat. No. 5,600,506 to Baum et al., entitled an Apparatus and Method for Determining the Position of a Transducer Relative to a Disk Surface in a Disk Drive System, U.S. Pat. No. 5,146,374 to Sakurai, entitled a Method and Apparatus for Determining Track Position of a Head on a Recording Medium, U.S. Pat. No. 4,631,606 to Sugaya, entitled a System for Detecting the Position of a Read-write Head on a Disk Recording Medium Having Servo Sectors with Three or More Servo Patterns, U.S. Pat. No. 5,383,068 to Shimizu et al., entitled a Head Position Recognition Method, a Speed Calculation Method, and a Head Movement Speed Control Device, and U.S. Pat. No. 5,105,318 to Tsuneta et al., entitled a Head Positioning Device for Use in Magnetic Disk Equipment.

SUMMARY OF THE INVENTION

It is therefore an object of the present invention to provide a head position detecting technique which can reduce a calibration execution time by detecting information needed to calculate a current position of a head at a single offset point.

According to one aspect of the present invention, a method for detecting a position of a head in a hard disk drive including at least one servo sector having a plurality of tracks in which servo burst signals are written includes the steps of: shifting the head to a track within which a crossing point of one of first and second servo burst signals written up and down with respect to the center of the track and a third burst signal written symmetrically with respect to the center of the track is situated; detecting an analog-to-digital conversion value at the crossing point; and calculating the position of the head by the following equation:

$$\text{Position} = \frac{(\text{burst } A - \text{burst } B) \times (T_{\max}/2)}{(\text{burst } A + \text{burst } B) - 2 \times P2'}$$

where burst A and burst B are analog-to-digital conversion values of the first and second burst signals, $T_{max}$ is a constant value when one track is designated as the basis of position information, P2' is an analog-to-digital conversion value at the crossing point of the crossing burst signals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
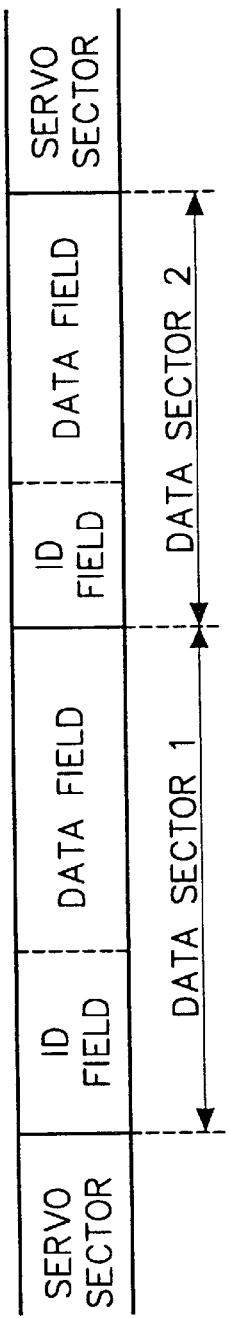
FIGS. 1A to 1E illustrate a sector format and detailed formats for each sector of a magnetic disk having a constant density recording form.

A sector format and detailed formats for each sector of the magnetic disk in the constant density recording form are illustrated in FIGS. 1A to 1E. FIGS. 1A to 1E, which are not necessarily drawn to scale, show one example of one sector format in an area having two perfect data sectors between servo sectors on the magnetic disk, that is, having data sectors which are not divided in adjacent data information areas. Referring to FIG. 1A, two data sectors are respectively divided into an identification (ID) field and a data field. Header information for identifying a corresponding data sector is written into the ID field. Actual digital data is written into the data field preceded by the ID field.

Figure 1B:

The ID field consists of an ID preamble, an ID address mark, an ID, a cyclic redundancy code (CRC) and an ID postamble, as shown in FIG. 1B. The ID preamble provides clock synchronization for the ID field during reading and simultaneously provides a gap before the ID field. The ID address mark indicates that the ID has started and provides synchronization for reading the ID. The ID is the header information, such as a sector number, a head number, a cylinder number, etc., for identifying the sector at which a head is currently positioned. The CRC is an error detecting code for detecting and correcting an error of the ID address mark and the ID. Generally, the CRC is generated by using a CRC-CCITT generating polynomial. The ID postamble provides a timing margin after reading the ID.

Figure 1C:
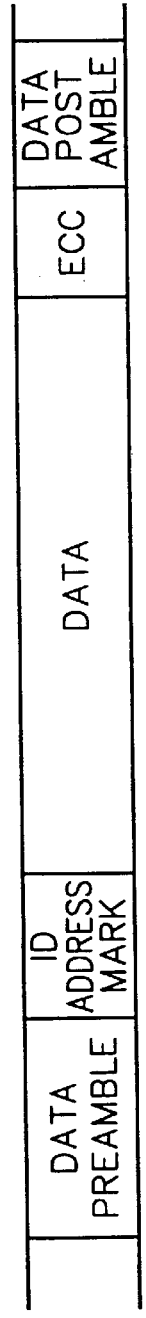
Figure 1D:
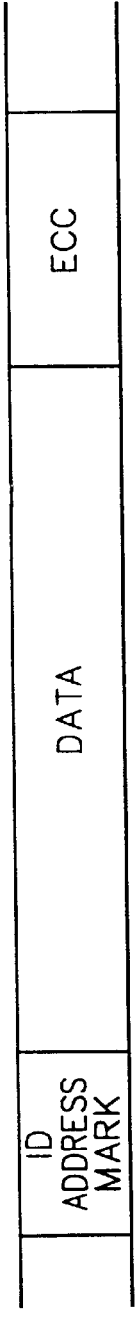

The data field consists of a data preamble, a data address mark, data, an error correction code (ECC) and a data postamble, as indicated in FIG. 1C. Meanwhile, the data field of the magnetic disk using a headerless servo write system is constructed as illustrated in FIG. 1D. The data preamble positioned between the ID postamble and a data synchronizing bit provides clock synchronization for the data field during reading and simultaneously provides a gap between the ID field and the data field. The data address mark indicates that the data has started and provides synchronization when is the magnetic disk driving apparatus reads the data. The data is the actual digital information stored in the magnetic disk. The ECC is the error detecting code for detecting and correcting an error of the data address mark and the data. The data postamble provides a timing margin after reading the data. Generally, since the ID postamble is adjacent to the data preamble, and the data postamble is adjacent to the ID preamble, they may be mixedly used.

Figure 1E:

As illustrated in FIG. 1E, the servo sector for writing the servo information for the servo control of the head consists of a preamble for adjusting synchronization with a system clock, a servo address mark (SAM) for writing a reference pattern of servo timing generation, an index (IDX) bit for providing one-rotation information of the disk, a gray code area for writing track information, and servo burst areas for the on-track control of the head.

Figure 2:
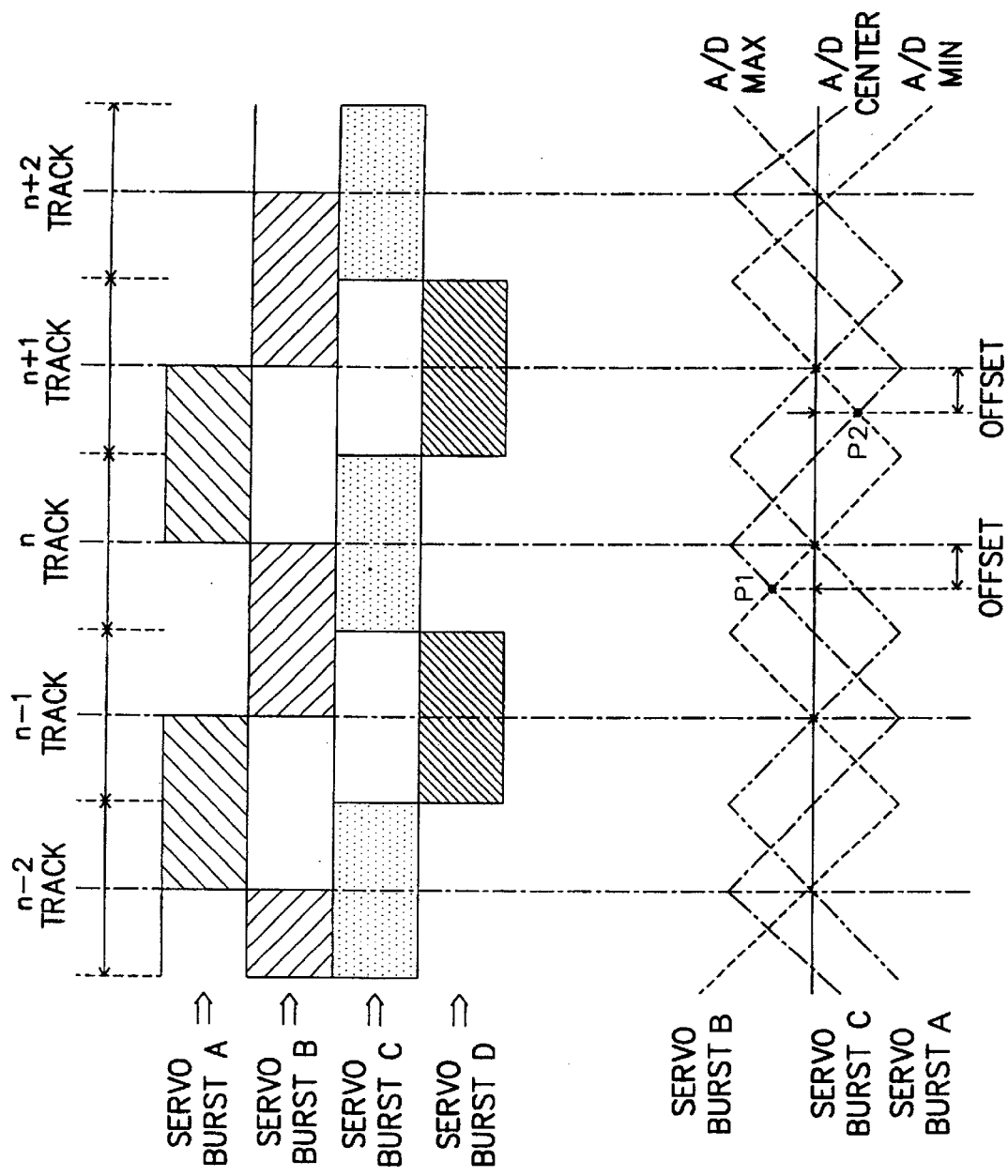
FIG. 2 illustrates a write pattern of servo burst signals and an A/D conversion values of the burst signals.

FIG. 2 shows a write pattern of servo burst signals (hereinafter, referred to as the burst signals) written in the servo burst area and analog-to-digital (A/D) conversion values of the burst signals. Burst signals A and B are written with a half value in adjacent tracks and used in detecting a position error signal of the head during track following. Burst signals C and D are written in even and odd tracks and used in discriminating the odd and even tracks, respectively.

In the hard disk drive, the servo write pattern of each track is converted into a digital value from an analog value to obtain the position information of the head. To accurately obtain the position information of the head, the A/D conversion value must be processed so as to correspond to the position of the head. To this, the current position of the head has been calculated by the following equation (1):

$$\text{Position} = \frac{(\text{burst } A - \text{burst } B) \times (T_{\max}/2)}{(\text{burst } A + \text{burst } B)} \times \frac{T_{\max}}{(P1' - P2')} \qquad (1)$$

where burst A and burst B indicate the A/D conversion values of the burst signals A and B, respectively, $T_{max}$ is a constant value when one track is indicated as the basis of position information, P1' and P2' designate the A/D conversion values at crossing points P1 and P2 of the burst signals A and C. Generally, the points P1 and P2 are situated at a point which is 25% offset from a center line of the track. To calculate the position of the head by the above equation (1), there are needed the A/D conversion values at the crossing points P1 and P2 of the burst signals A and C. The hard disk drive usually obtains the A/D conversion values at the points P1 and P2 through a calibration process performed when powered ON.

That is, a servo control means (typically, a microprocessor) shifts the head to the point P1 (a 25% offset point) and repeatedly reads the burst signal written in the burst interval while the disk rotates a specified number of times. Thereafter, an average of the A/D conversion values of the detected burst signals is calculated and stored. The head is again shifted to the point P2. The above-described steps are then repeated at the point P2 to obtain the A/D conversion value at the point P2. The position of the head is calculated by substituting the A/D conversion values at the points P1 and P2 for the above equation (1). Namely, since the A/D conversion values at the crossing points P1 and P2 of the burst signals A and C should be obtained, the calibration process is delayed.

Figure 3:
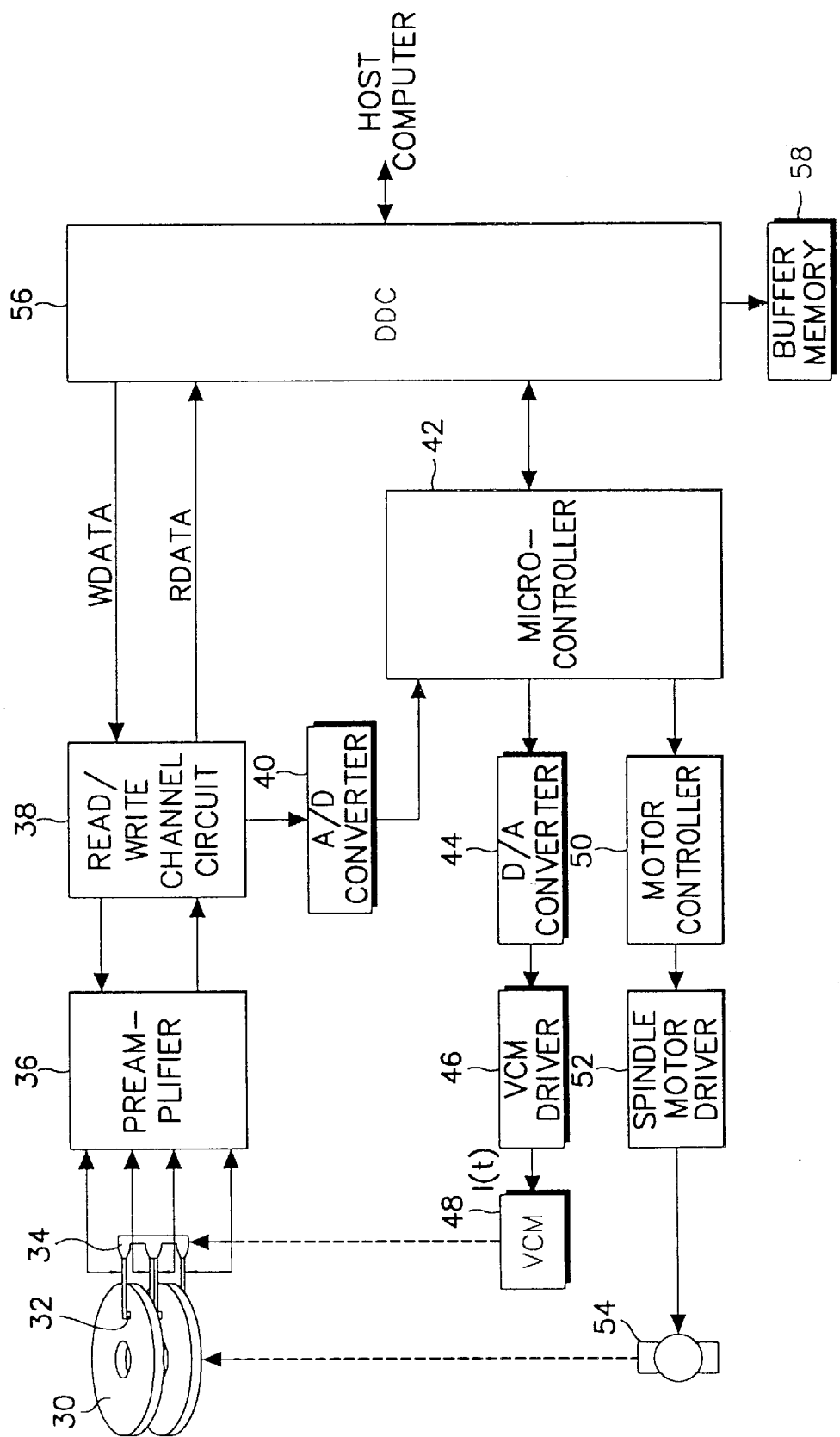
FIG. 3 is a block diagram of a hard disk drive.

Referring to FIG. 3, there is shown a hard disk drive of a multiplatter type having two disks 30 and four heads 32. The disks 30 of the hard disk drive utilizing the multiplatter type take a stacked form and are installed on one spindle motor 54. Each surface of the disks 30 corresponds to one head. The heads 32 are positioned on the surfaces of the disks 30 and installed on vertically extended arms 34 of an arm assembly of a rotary voice coil motor (VCM) 48. A preamplifier 36 preamplifies, during data reading, a read signal picked up by one of the heads 32 and supplies the amplified signal to a read/write channel circuit 38. During data writing, the preamplifier 36 writes encoded write data transmitted from the read/write channel circuit 38 into the disk 30 by driving one of the heads 32. In this case, the preamplifier 36 selects one of the heads 32 under the control of a disk data controller (DDC) 56.

The read/write channel circuit 38 detects and decodes a data pulse from the read signal transmitted from the preamplifier 36 to generate read data RDATA, and encodes write data WDATA transmitted from the DDC 56 to supply the encoded data to the preamplifier 36. The read/write channel circuit 38 also demodulates head position information which is a part of servo information written into the disk 30 to generate a position error signal. The position error signal generated by the read/write channel circuit 38 is supplied to an analog-to-digital (A/D) converter 40. The A/D converter 40 converts the position error signal into a corresponding digital step value and supplies the digital value to a microcontroller 42. The DDC 56 writes data received from a host computer into the disk 30 through the read/write channel circuit 38 and the preamplifier 36, or reads data from the disk 30 to supply the read data to the host computer. The DDC 56 also interfaces communication between the host computer and the microcontroller 42.

The microcontroller 42 has a memory for storing a control program according to the present invention and controls the overall operation of the hard disk drive in response to a read/write command received from the host computer. A digital-to-analog (D/A) converter 44 converts a position control value of the heads 32, generated by the microcontroller 42, into an analog signal. A VCM driver 46 supplies, to the VCM 48, a driving current I(t) for driving an actuator by a signal transmitted from the D/A converter 44. The VCM 48 horizontally shifts the heads 32 onto the disks 30 in response to the direction and level of the driving current I(t) generated by the VCM driver 46. A motor controller 50 controls a spindle motor driver 52 according to a disk rotation control value generated by the microcontroller 42. The spindle motor driver 52 rotates the disks 30 by driving the spindle motor 54 under the control of the motor controller 50. A buffer memory 58 temporarily stores data transmitted between the host computer and the disks 30 under the control of the DDC 56.

Figure 4:
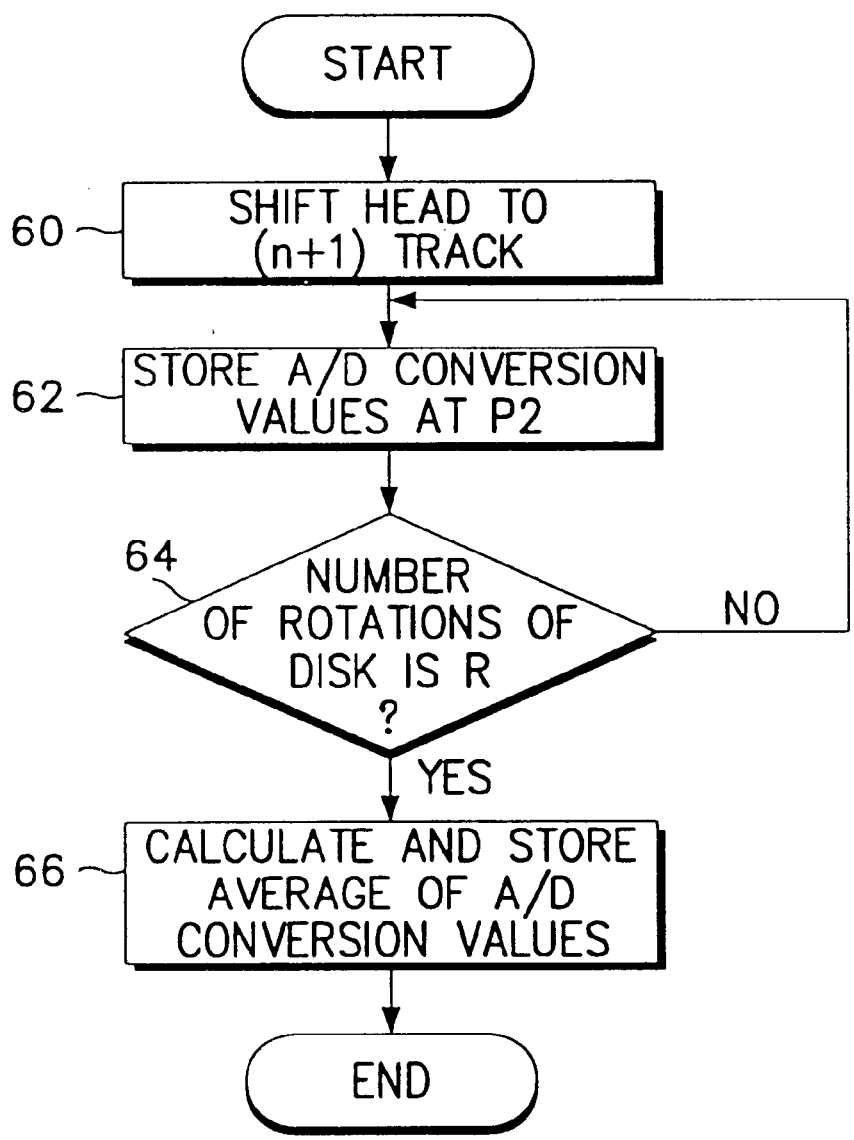
FIG. 4 is a flowchart illustrating an A/D conversion value detecting process at a single offset point according to a preferred embodiment of the present invention.

FIG. 4 shows an A/D conversion value detecting process at a single offset point. If a power source is ON, the microcontroller 42 detects the A/D conversion value needed to calculate the position of the head 32 during servo control through the following calibration process. Namely, the microcontroller 42 shifts the head 32 to a setting track at step 60. The setting track is one of the tracks situated at crossing points P1 and P2 of the burst signals A and C as shown in FIG. 2. In the following description, an $(n+1)^{th}$ track situated at the point P2 will be defined as the setting track. At steps 62 and 64, the microcontroller 42 stores, in an internal memory, the A/D conversion values detected at the point P2 while the disk 30 rotates a prescribed number of times R. At step 66, the average of the A/D conversion values is calculated and stored in the internal memory.

The current position of the head 32 can be calculated by substituting for the A/D conversion value at a single offset point P2 detected through the calibration process for the following equation (2) given by:

$$\text{Position} = \frac{(\text{burst } A - \text{burst } B) \times (T_{\max}/2)}{(\text{burst } A + \text{burst } B) - 2 \times P2'} \quad (2)$$

where burst A and burst B indicate the A/D conversion values of the burst signals A and B, respectively, $T_{max}$ is a constant value when one track is indicated as the basis of position information, and P2' designates the A/D conversion value at the crossing point P2 of the burst signals A and C. In the present case, $T_{MAX}$ is a constant value indicative of the maximum position value that an be obtained in one track and is related to the resolution, or maximum conversion value (A/D MAX), of A/D converter 40, i.e., $T_{MAX}=2^N$ (where N may be 8, 9, 10, or etc . . . ), and N in the present case is preferably equal to 9, such that $T_{MAX}=512$.

That is, the current position of the head can be calculated by using only the A/D conversion value detected at the single offset point P2, thereby reducing a calibration execution time.

As described above, unlike a conventional method for calculating the position of the head by using the A/D conversion values detected at two offset points, the position of the head is calculated by using the A/D conversion value detected at one offset point. Therefore, the calibration execution time and the head position calculating time can be reduced.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A method of detecting a position of a head in a hard disk drive including at least one servo sector having a plurality of tracks in which servo burst signals are written, said method comprising the steps of:

shifting said head to a track within which a crossing point of one of first and second servo burst signals written up and down with respect to the center of the track and a third burst signal written symmetrically with respect to the center of the track is situated;

detecting analog-to-digital conversion values at said crossing point; and calculating the position of said head by the following equation:

$$\text{Position} = \frac{(\text{burst } A - \text{burst } B) \times (T_{\max}/2)}{(\text{burst } A + \text{burst } B) - 2 \times P2'}$$

where burst A and burst B are analog-to-digital conversion values of said first and second burst signals, $T_{max}$ is a constant value when one track is designated as a basis of position information, and P2' is an analog-to-digital conversion value of the burst signals at said crossing point.

2. The method as claimed in claim 1, said analog-to-digital conversion value of the burst signals at said crossing point being determined by taking the mean of analog-to-digital conversion values of said burst signals detected at said crossing point after rotating a disk in said hard disk drive a prescribed number of times.

3. An apparatus for detecting a position of a head in a hard disk drive including at least one servo sector having a plurality of tracks in which servo burst signals are written, comprising:

a means for shifting said head to a track within which a crossing point of one of first and second servo burst signals written up and down with respect to the center of the track and a third burst signal written symmetrically with respect to the center of the track is situated;

a detector for detecting analog-to-digital conversion values at said crossing point; and a calculator for calculating the position of said head by the following equation:

$$\text{Position} = \frac{(\text{burst } A - \text{burst } B) \times (T_{\max}/2)}{(\text{burst } A + \text{burst } B) - 2 \times P2'}$$

where burst A and burst B are analog-to-digital conversion values of said first and second burst signals, $T_{max}$ is a constant value when one track is designated as a basis of position information, and P2' is an analog-to-digital conversion value of the burst signals at said crossing point.

4. The apparatus as claimed in claim 3, said detector determining said analog-to-digital conversion value of the burst signals at said crossing point by taking a mean of analog-to-digital conversion values of the burst signals detected at said crossing point while rotating a disk in said hard disk drive a prescribed number of times.

5. A method of detecting a position of a head over a disk in a hard disk drive wherein said disk includes first and second burst signals used in detecting a position error signal and third and forth burst signals used in discriminating an odd or even track, wherein said first and second burst signals extend across adjacent tracks and said third and fourth burst signals do not extend across adjacent tracks, said method comprising the steps of:

moving a head to a predetermined track having a crossing point defined as a point where one of said first and second burst signals crosses one of said third and fourth burst signals;

storing analog-to-digital conversion values detected at said crossing point; and determining a head position by using said stored analog-to-digital conversion values according to the following equation:

$$\text{Position} = \frac{(\text{burst } A - \text{burst } B) \times (T_{\max}/2)}{(\text{burst } A + \text{burst } B) - 2 \times P2'}$$

where burst A and burst B are analog-to-digital conversion values of said first and second burst signals, $T_{max}$ is a constant value, and P2' is an analog-to-digital conversion value of the burst signals crossing at said crossing point.

6. The method as claimed in claim 5, further comprising a step of determining an average of said analog-to-digital conversion value of the burst signals at said crossing point by detecting the analog-to-digital conversion value of the burst signals at said crossing point a predetermined number of times while a disk is rotated said prescribed number of times and storing said average in memory.

* * * * *